US006432232B1

(12) United States Patent
Martin

(10) Patent No.: US 6,432,232 B1
(45) Date of Patent: Aug. 13, 2002

(54) SYSTEM FOR AUTOMATICALLY PRODUCING LETTERS HAVING MULTIPLE PAGE CAPABILITY

(76) Inventor: Samuel W. Martin, Martin Rd., Weston, CT (US) 06883

( * ) Notice: Subject to any disclaimer, the term of this patent is extended or adjusted under 35 U.S.C. 154(b) by 0 days.

(21) Appl. No.: 09/438,609

(22) Filed: Nov. 12, 1999

Related U.S. Application Data

(60) Provisional application No. 60/107,573, filed on Nov. 9, 1998.

(51) Int. Cl.$^{7}$ ................................................ B32B 31/00

(52) U.S. Cl. ......................... 156/64; 156/217; 156/222; 156/364; 156/442.1; 156/442.2; 229/92.1

(58) Field of Search .......................... 156/64, 217, 221, 156/222, 227, 252, 277, 364, 441.5, 442.1, 442.2, 442.3, 443, 384, 387; 229/92, 92.1

(56) References Cited

U.S. PATENT DOCUMENTS

| | | | | | |
|---|---|---|---|---|---|
| 3,995,808 | A | * | 12/1976 | Kehoe | 229/73 |
| 5,006,195 | A | * | 4/1991 | Martin et al. | 156/442.1 |
| 5,048,748 | A | * | 9/1991 | Martin et al. | 229/92.1 |
| 5,054,757 | A | * | 10/1991 | Martin et al. | 270/45 |
| 5,114,067 | A | * | 5/1992 | Martin et al. | 229/92.1 |
| 5,118,379 | A | * | 6/1992 | Martin et al. | 156/442.1 |
| 5,192,389 | A | * | 3/1993 | Martin | 156/364 |

* cited by examiner

*Primary Examiner*—James Sells

(57) ABSTRACT

A system for automatically feeding, assembling, folding and sealing a pre-folded self-mailer form sheet having a letter size enclosure when utilized with a B-size printer electronically connected to a computer that may in turn be connected through a modem to the Internet for receiving text signals via E-mail from remote locations.

11 Claims, 5 Drawing Sheets

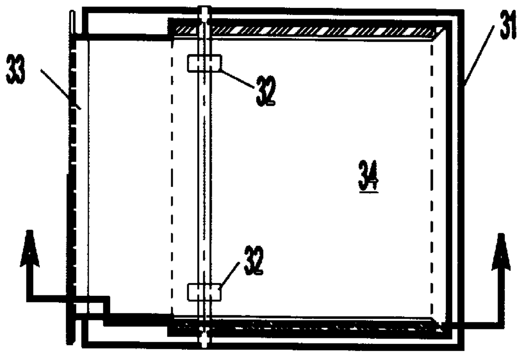
FIG. 7
FIG. 8A
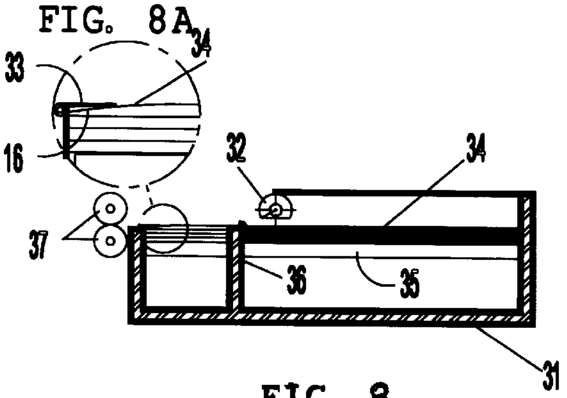
FIG. 8
FIG. 9A
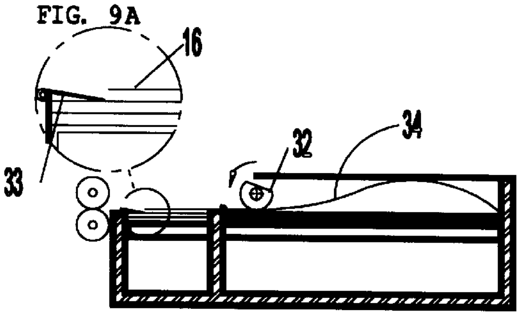
FIG. 9
FIG. 10A
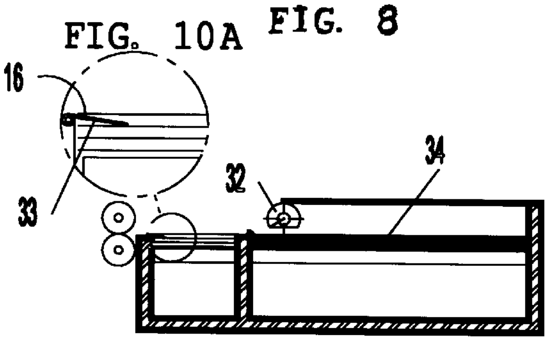
FIG. 10
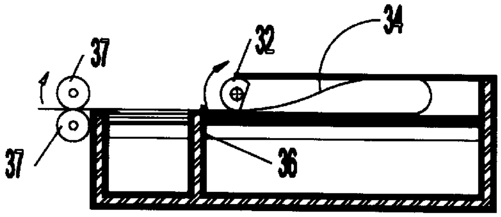
FIG. 11
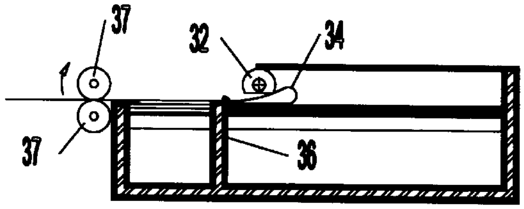
FIG. 12

SYSTEM FOR AUTOMATICALLY PRODUCING LETTERS HAVING MULTIPLE PAGE CAPABILITY

This application claims the benefit of provisional application No. 60/107,573, filed Nov. 9, 1998.

BACKGROUND OF THE INVENTION

This invention relates to system for automatically producing letter mail. More particularly, it relates to a larger, letter size self-mailer form and apparatus to feed, fold and seal it, and additional pages if desired, at any suitably equipped printer electronically connected to a source computer including Internet connections such as E-mail.

Self-mailers, that is form sheets on which may be printed address information and message information and then folded and sealed to form a mail piece, are well known. U.S. Pat. No. 3,995,808; to: Kehoe; for: UNIT CONTAINING VARIABLE MESSAGES; issued: Dec. 7, 1976 and U.S. Pat. Nos. 5,048,748: to: Martin et al: for: SINGLE SHEET SELF-MAILING FORM WITH IMPROVED OPENING CHARACTERISTICS: issued Sep. 17, 1991 and U.S. Pat. No. 5,114,067: to: Martin et al: for: SINGLE SHEET SELF-MAILING FORM WITH IMPROVED FEEDING CHARACTERISTICS: issued May. 19, 1992 all disclose forms that permit the printing of both message and address information on one side of the form, then get folded and sealed to place the message inside and address outside wherein opening of the form, by tearing off a perforated strip along the top, separates the message portion from the address portion.

These forms may be processed by apparatus such as that taught by U.S. Pat. Nos. 5,006,195: to: Martin et al: for: APPARATUS FOR FOLDING AND SEALING A FORM ALONG A TRANSVERSE EDGE: issued Apr. 19, 1991, and U.S. Pat. No. 5,192,389: to: Martin: for: APPARATUS FOR PREPARING A SELF-MAILER HAVING PRINTER, FOLDER AND TRANSPORT MEANS: issued Mar. 9, 1993 which are designed to fold and seal the self-mailer forms described in the above mentioned patents. They are designed to process a one page legal size form with a half page message portion exiting a printer situated above the apparatus.

U.S. Pat. No. 5,054,757: to: Martin et al: for: MECHANISM AND METHOD FOR ACCUMULATING AND FOLDING SHEETS: issued Oct. 8, 1991 discloses the accumulation of sheets of a letter which are stopped by the nip of a pair of stopped rollers prior to folding. This mechanism does handle letter size pages, but it is relatively complex and expensive and requires a trained operator.

None of the above mailing systems has achieved popularity because of limitations such as the message size, expense of the equipment and the reluctance of mailers to change. This is despite the hassle of "getting out the mail" in offices both large and small.

Recently E-mail via the Internet is being used with greater frequency to relay messages that have conventionally been sent by regular surface or air mail, which has been dubbed "snail mail". E-mail is fast, but it has disadvantages. Firstly, E-mail obligates the recipient to access his computer and call up the message. Secondly, if the recipient wants a hard copy, he must make the effort to download the message and print it out. If the sender wants to be sure that the recipient gets a hard copy, he must use snail mail.

Thus, it is an object of the subject invention to provide an inexpensive system that can automatically generate finished letter mail, of several pages if desired, at lightly attended remote terminals, so long as the system is electronically connected to a computer, anywhere in the world when tied to the Internet and E-mail.

It is a further object of the subject invention to provide a full letter size enclosure self-mailer form on a single sheet for use with larger size office printers. It is another object of the subject invention to pre-fold the forms to a 9-½"×11-½" size during manufacture for easier handling and to minimize the size of a feeder to input the forms into printers which is a further object of the subject invention.

It is a further object of the subject invention to provide a mechanism for collating additional pages with the letter before the form enters a folding and sealing device and means within the folder to assure that the pages stay together during the folding and sealing process.

It is a further object of the subject invention to provide a system for timely and inexpensive delivery of hard copy E-mail messages.

BRIEF SUMMARY OF THE INVENTION

The above objects are achieved and the disadvantages of the prior art overcome in accordance with the subject invention by means of a single sheet self-mailer form having a letter size enclosure portion and apparatus to feed it into a larger size office printer, to capture it as it exits the printer, assemble it with additional pages if required, and to fold and seal it or them automatically. The form is produced on a sheet of paper stock which is pre-folded once into a size convenient for packaging and handling. The folded form is unfolded as it feeds into a printer then, after being printed, it is folded thrice, with the second fold at the pre-fold crease. The form is fed into the printer letter end first so that the letter portion gets printed first, followed by the envelope portion on which the return address, postal indicia, destination address and Zip +4 bar code are printed, all on the same side of the paper.

In accordance with a second aspect of the subject invention, additional pages may be added to the form's letter by placing a collating device between the printer and a folder sealer that folds and seals the form. The collator collects the pages, either from the printer utilizing a separate input or an external feeder, in reverse order, then the letter portion of the form, and feeds all together into the folder sealer for finishing. The form letter is thus necessarily always page 1.

The form is designed to be opened by tearing off the perforated top edge which removes the top and bottom of the envelope portion of the form and the connecting link between the letter and envelope portions. Thus the remainder is an open envelope with a letter inside. The form is perforated during manufacture so that the perforations are aligned after the form is folded into a #10 envelope size.

Because of the unique size and shape of the pre-folded form, an input feeder for printers has been designed that takes advantage of the form's configuration to guarantee singulation by placing constraints in front of the two edges of the envelope portion of the form which hold it back when the feed rollers advance the letter portion then allow that portion to follow the letter portion as the form unfolds. The unfolded form then gets printed and exits the printer into a collator tray and thence into a folder sealer apparatus for finishing. In the case of a multiple page letter, the extra pages are printed first, in reverse order, and held in the collator tray until page one, printed on the form, is aligned with the extra pages and the collation is folded together and sealed in the folder sealer apparatus. The second fold of the form is along the pre-fold line which assures a tight fold and also, unlike many self-mailers, is not weakened by perforations used to attract a fold.

When the form with extra pages enters the second buckle chute, the extra pages are not confined by the first fold so could conceivable separate from the form when the second fold is made and the collation reverses direction. To prevent such an occurrence, a spring device is placed in the buckle chute where it is compressed by the leading edge of the once-folded collation and then pushes the collation into the second fold when it reverses, thus avoiding a separation.

This ability to completely prepare the mail automatically opens the door for a mailing system which will enable individuals, businesses, services and post offices to send messages via E-mail to a suitably equipped terminal anywhere for production of a hard copy of the E-mail. In addition to interoffice mail for a far flung company, a "Hard-E-mail" business could offer such a service by setting up a central computer to collect E-mail messages, along with the sender's account number, then forward that sender's message, return address, logo, etc. to the "Hard-E-mail" office nearest the destination address for automatic preparation and deposit. The address could include a Zip+4 bar code and an Information Bearing Indicia where the destination is the local USPS office. The hard E-mail would then catch the next local mail delivery, perhaps many days ahead of "snail mail". Where the "Hard-E-mail" business didn't have an office, it could have partners to handle that locality.

BRIEF DESCRIPTION OF THE DRAWINGS

FIG. 7 shows a top view of the folded from feeder.

FIG. 8 shows a section view of the feeder after a form has been fed out.

FIG. 8A is an exploded view of the lead edge of the form with the ramp on top.

FIG. 9 shows a section view of the feeder after a form has been fed backwards to allow the ramp to drop.

FIG. 9A is an exploded view of the lead edge of the form with the ramp dropped.

FIG. 10 shows a section view of the feeder after a form has been returned over the ramp.

FIG. 10A is an exploded view of the lead edge of the form ready to feed out.

FIG. 11 shows a section view of the feeder with the form pulling the envelope portion into a loop.

FIG. 12 shows the bottom of the form looping under the feed rolls.

DETAILED DESCRIPTION OF PREFERRED EMBODIMENTS OF THE SUBJECT INVENTION

Figure 1:
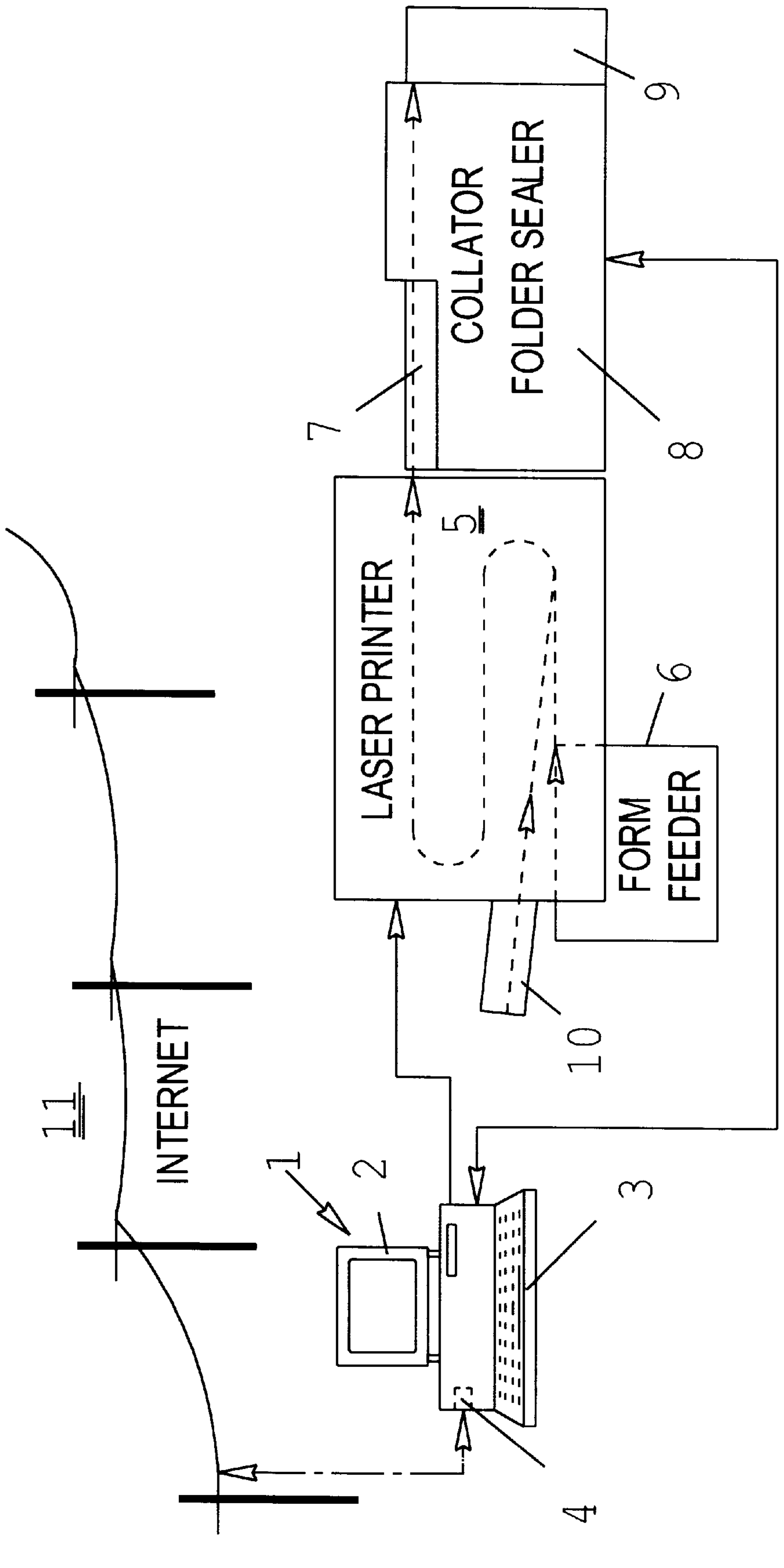
FIG. 1 is a block diagram of the system.

FIG. 1 shows a system for producing mail pieces of the subject self-mailer form sheet with an optional connection to the Internet 11. The system includes a personal computer 1 linked to a laser printer 5 through conventional means, such as a Centronics parallel interface, the subject form feeder 6, folder sealer 8 and collator 7, also connected to the computer, and stacker 9. The computer includes a monitor 2, a keyboard 3 and an optional modem 4 for an Internet connection. The laser printer has the capability of handling 11" wide paper as well as letter size pages via input tray 10. Most "B size" or 11"×17" laser printers have double detection sensing systems that consider a piece of paper over 17" long to be a double and stop the operation. However, others do handle paper 20" or more long although the print area is restricted to 17 . Data Products Corp. has such a device on the market. Since the U.S. version of the subject form is 20" long, Data Products printers would be the first candidate, but others will surely follow. The 17" print restriction is no problem since the letter portion and the upper half of the envelope portion measure 15-¾"

The Internet connection is optional since the system can operate perfectly well at a local computer for local delivery. The controls and data exchange are no different from other office laser printer and word processors. The signals from the printer to the form feeder will likewise be the common ones although the feeder will require its own microprocessor to manipulate the feed rollers as described herein.

Figure 2:
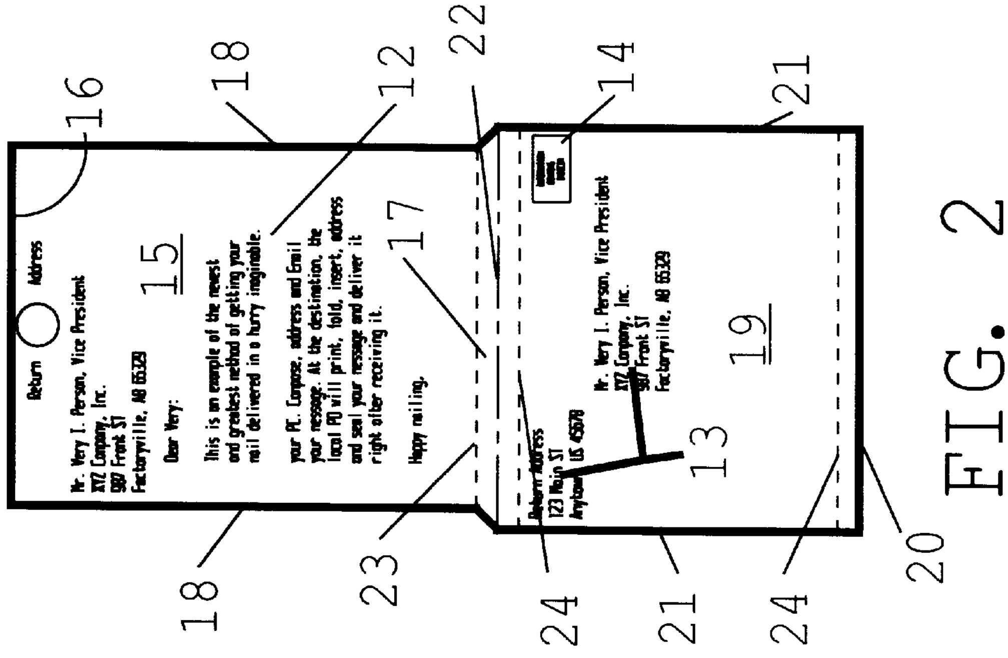
FIG. 2 shows the printed side of the form as it exits a printer.

FIG. 2 shows obverse side of the subject self mailer form after printing of the message 12 and addresses 13 and optional information bearing indicia 14. The letter portion of the form 15 is bounded by an upper edge 16, a connecting strip 17 and longitudinal edges 18. The lower envelope portion 19 is bound by a bottom edge 20, longitudinal edges 21 and the connecting strip 17 having been folded along its lower edge 22 during manufacture. The bottom edge 23 of letter portion 15, and two transverse lines 24 equidistant by a dimension equal to the width of connecting strip 17 above and below the upper edge 22 and lower edge 20 are weakened, preferably by intermittent slits, during manufacture.

Figure 3:
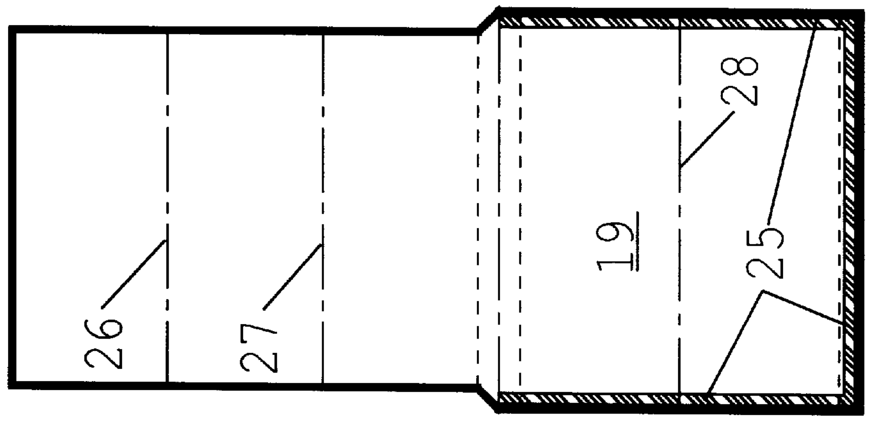
FIG. 3 shows the opposite side of the form, its glue bearing areas and fold positions.

FIG. 3 shows the reverse of the form with glue strips 25 shown around the outer edges of the envelope portion 19. The position of the first fold is indicated along line 26, the second fold is a re-folding of 22, and the double third fold positions are indicated by lines 27 and 28.

Figure 4:
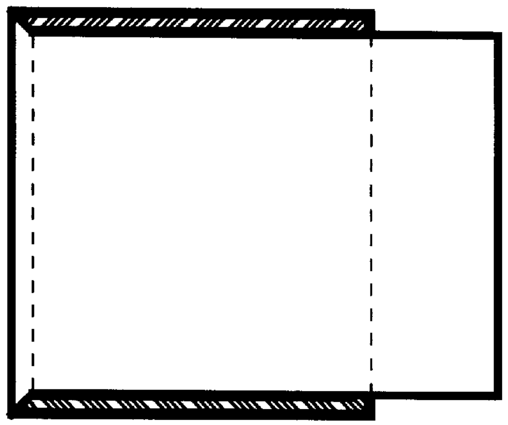
FIG. 4 shows the form pre-folded as it will be packaged.

FIG. 4 shows the form pre-folded as it comes from the manufacturer in a more compact attitude.

Figure 5:
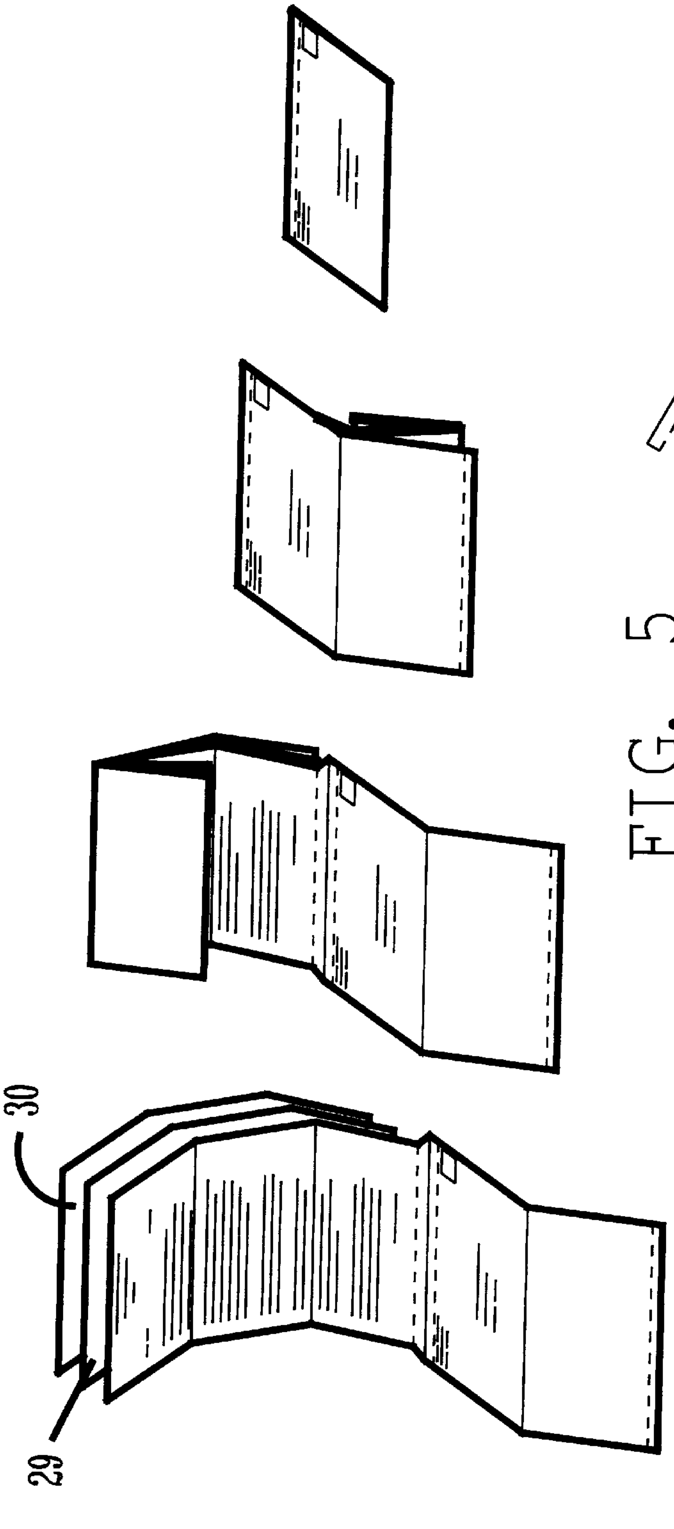
FIG. 5 shows a progression of how the form is folded with additional pages.

FIG. 5 shows the progressive folding of a form incorporating a second page 29 and third page 30. For clarity, the fold lines are shown where they will occur.

Figure 6:
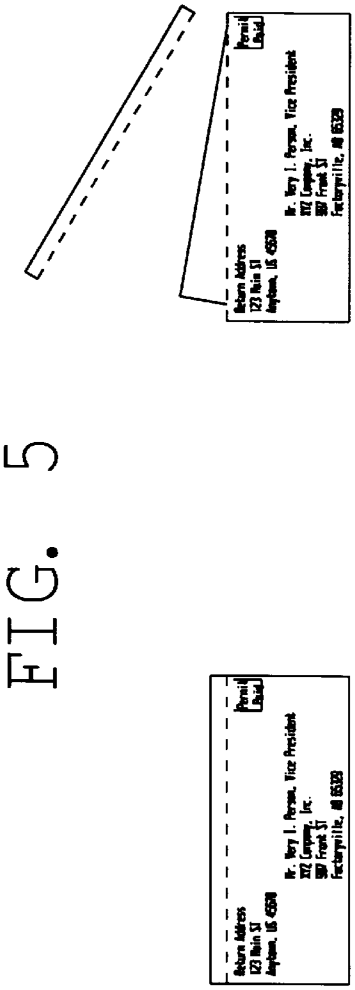
FIG. 6 shows how the form is torn open to separate the letter portion from the envelope portion.

FIG. 6 shows how tearing the mail piece along the three intermittently slit or perforated lines 23 and 24 both opens the envelope and separates letter portion 15 from envelope portion 19 since connecting strip 17 is removed.

FIG. 7 shows a top view of the form feeder 31 for inputting to laser printers showing the attitude of the forms and how the D-shape feed rollers 32 are placed about four inches back from the lead edge of the forms 16 so as to provide a firm normal force under the rollers. It also shows the top view of the pivoting ramp 33 used to guide the leading edge 16 into the printer.

FIG. 8 is a section through the feeder showing the topmost pre-folded form 34 with its leading edge 16 resting on top of ramp 33 alter the previous form has left, best seen in exploded view FIG. 8A. Also shown are the servo-controlled elevator 35 which raises the stack of forms to the proper position for feeding and the corner stop fence 36.

FIG. 9 shows the position of rollers 32 after reversing to retract the leading edge 16 of form 34 to allow ramp 32 to drop down as shown more clearly in FIG. 9A.

FIG. 10 shows rollers 32 back at the same position as FIG. 8 but with the leading edge 16 on top of ramp 33 and with form 34 back to its flat position better viewed in FIG. 10A.

FIG. 11 shows rollers 32 feeding form 34 into printer input rollers 37 with the trailing envelope portion of form 34 constrained from also feeding by fence 36 and therefore looping as it unrolls.

FIG. 12 shows form 34 feeding further into the printer rollers under rollers 32 which are stopped to provide clearance. Once the loop passes fence 36, the trailing edge follows.

Figure 13:
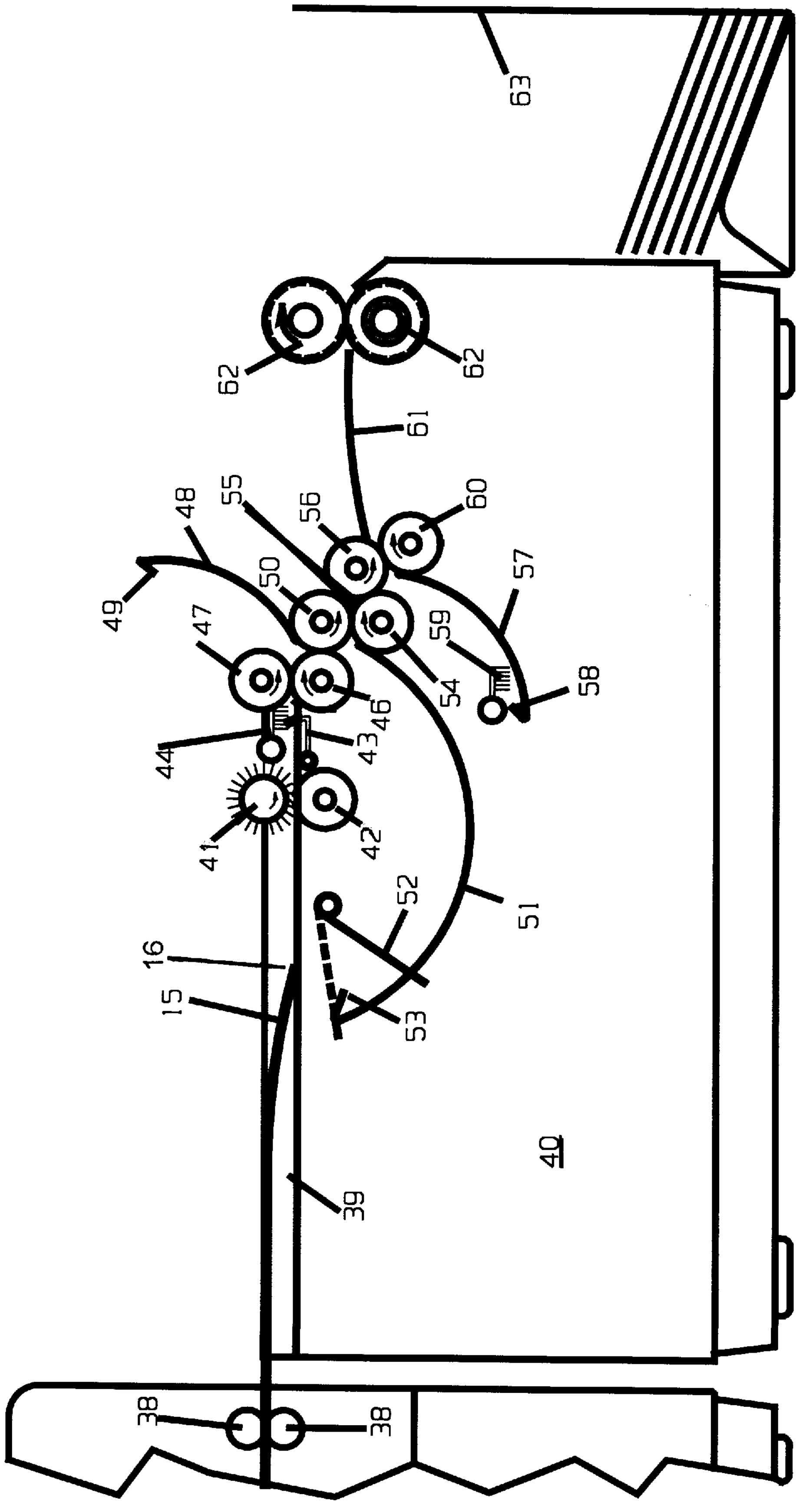
FIG. 13 shows a section view of a folder sealer and a collator placed at a printer's exit.

FIG. 13 shows a cross-section elevation view of a folder sealer 40 with a collator station 39 receiving a form 15 output from a printer. Urge wheel 41 pushes the leading edge 16 of the form into the first pair of folding rollers 46 and 47. If additional pages are input to the collator, stop fingers 43 rotate into the path to register the lead edges while wheel 41 urges them. Once the lead edge 16 of the form, on top of any pages, reaches the fingers they are retracted and the whole collation enters folding rollers 46 and 47. The folder's drive is typical of office folding machines in that the rollers are motor driven together via belts or gears with the surface speeds being equal throughout.

In the case where re-moistenable glue is utilized to seal the forms, water applicators 44 apply water to the glue strips along the sides of the envelope portion of the form as it enters the folder. As the lead edge of the form or collation enters, it slides along buckle chute 48 until it hits stop 49 and buckles all the pages. The buckle is grabbed by rollers 46 and 50 forming a fold at crease line 26 shown in FIG. 3. This fold is now the leading edge and follows buckle chute 51 to stop 53, meanwhile hitting spring 52 and pushing it to the stop as well. The form then re-folds along crease 22 shown in FIG. 2 as it is grabbed by rollers 50 and 54 and reverses the motion of the form. If friction between the form and the added pages is too weak to keep the pages with the form, spring 52 will rebound with the collation and push the extra pages back into the nip of rollers 50 and 54. Guide 55 then deflects the leading edge, now 22, into buckle chute 57 to stop 58 at which time moisteners 59 moisten the edge that meets the glue strip along the bottom of the envelope portion 20 as the last fold is made when rollers 56 and 60 grab the last buckle. The folded form now is deflected along guide 61 to exit rollers 62 which provide a final squeeze and drop the finished self-mailer into the stacker 63. In the case where pressure sensitive glue is used, rollers 62 provide sufficient force to seal the form.

The above embodiments of the subject invention have been described by way of illustration only, and other embodiments of the subject invention will be apparent to those skilled in the art from consideration of the detailed description given above and the attached drawings. Accordingly, limitations on the subject invention are to be found only in the claims set forth below.

What is claimed is:

1. A self-mailer form incorporating a standard letter size message portion and a standard size envelope portion, comprising:

(a) a substantially rectangular upper letter portion having opposed upper and lower edges and opposed longitudinal edges;

(b) a substantially rectangular lower envelope portion having a width greater than said upper letter portion, and having opposed upper and lower edges and opposed longitudinal edges, said lower envelope portion being perforated or intermittently slit along a first transverse line parallel to, and spaced from said lower edge of said lower envelope portion by a predetermined distance, and being perforated or intermittently slit along a second transverse line parallel to said first line, said second line being spaced from said upper edge by said predetermined distance; wherein (c) said lower edge of said lower envelope portion and said opposed longitudinal edges of said lower envelope portion being bordered by narrow strips of glue which is activated by solvent or pressure;

(d) a substantially rectangular connecting portion attached along said upper edge of said lower envelope portion, and said lower edge of said upper letter portion having a length substantially equal to said predetermined distance, said form being perforated or intermittently slit along said lower edge of said upper portion; wherein (e) said form is folded during manufacture along said upper edge of said lower envelope portion.

2. Forms as described in claim 1 wherein said forms are packaged and distributed in said folded configuration.

3. Apparatus for feeding said folded self-mailer forms as described in claim 1 and packaged in claim 2 into printing means connected to a computer, comprising:

(a) servo-controlled elevator tray means to position topmost of a stack of said forms under feed means; wherein (b) said stack is positioned so that said form's upper edge of said upper letter portion will be fed first into input rollers of said printing means;

(c) said feed means is positioned behind said envelope portion's bottom edge to assure adequate normal force between said form and said feed means when feeding;

(d) the feed means being re-positioned above said stack with a gap of pre-determined distance after said feed means advances said form into said input rollers, said gap being sufficient for said form to unfold without creating an unwanted crease; wherein (e) electronic signal means from said printing means to said feed means cause said feed means to advance said topmost self-mailer form into input rollers of said printing means causing said envelope portion to unfold while following said letter portion into said input rollers.

4. Method for guiding said unfolded self-mailer forms out of apparatus for feeding said forms described in claim 3, having:

(a) a pivoted ramp across the leading edge of said letter forms to direct leading edge up into said printing means; wherein (b) said feed means retracts said letter portion of said form, by feeding backwards and buckling said letter portion, sufficient to allow said ramp to drop down in front of said leading edge; wherein (c) said feed means reverses direction and feeds said leading edge of said form forward atop said ramp.

5. Apparatus for preparing a self-mailer form as described in claim 1 or an identical form which has not been folded comprising:

(a) printing means, responsive to text signals from a computer, word processor or communication network defining information to be printed for printing both an address and message information on said self-mailer form;

(b) folder means for receiving said self-mailer form output from said printing means and progressively folding and sealing said form to prepare said self-mailer; wherein said folding and sealing means further comprises:

b1) a first set of fold rollers and a first buckle chute to fold the top ⅓of said letter portion;

b2) a second set of fold rollers and a second buckle chute to refold said form along said upper edge of said lower envelope portion;

b3) a third set of fold rollers and a third buckle chute to fold said lower envelope portion of said form sheet about a transverse line substantially bisecting said envelope portion;

(c) moistening means to selectively moisten said glue strips with solvent along said bottom edge and said opposed longitudinal edges of said lower envelope portion during said folding;

(d) ejection means, such as a spring, to keep multiple pages together exiting said second buckle chute, where required.

6. Apparatus described in claim 5 wherein said forms utilize pressure sensitive glue; wherein (a) said prepared forms are passed between a pair of pressure sealing rollers at output of said apparatus for preparing a self-miler form; wherein (b) said pressure rollers concentrate pressure along said glue strip areas of said forms being sealed to avoid additional thickness areas of multiple page letters.

7. Apparatus for assembling a multiple page letter comprised of a standard letter size self-mailer form, upon which page one has been printed on the letter portion along with its address on the envelope portion, and additional pages printed on standard letter size sheets to be situated between output from a printing means attached to and receiving text signals from a computer and apparatus for preparing a self-mailer form comprising:

(a) means for collating and aligning said additional pages or upper letter portion of said self-mailer form output from said printing means; wherein (b) said upper letter portion of said standard letter size self-mailer form is immediately fed out to said apparatus for preparing a self-mailer form sheet after alignment; whereas said additional pages, being printed in reverse order, precede said single sheet letter size self-mailer form through said printing means and into said collating, aligning and feeding apparatus and are aligned and held in a bottom-up collation until said single sheet letter size self-mailer form is output from said printing means and aligned atop said collation whereupon said collation is fed into said apparatus for preparing a self-mailer, folded together and sealed into a multiple page self-mailer letter; wherein (c) said upper letter portion of said single sheet letter size self-mailer has been printed as page 1 of said multiple page self-mailer letter.

8. Apparatus as described in claim 7 where said additional pages are fed into said collating and aligning means from a source other than said printing means.

9. Apparatus for assembling a multiple page self-mailer as described in claim 7 where said computer receives said text signals via Email over the Internet.

10. Apparatus as described in claim 8 wherein said Email text has been collected and forwarded by a central computer to such apparatus located close to the destination address.

11. Apparatus as described in claim 9 wherein owner of said central computer collects fees for forwarding said text signals, assembling said self-mailers, printing postal indicia thereon and depositing same for local postal delivery services.

* * * * *